Figure 1:
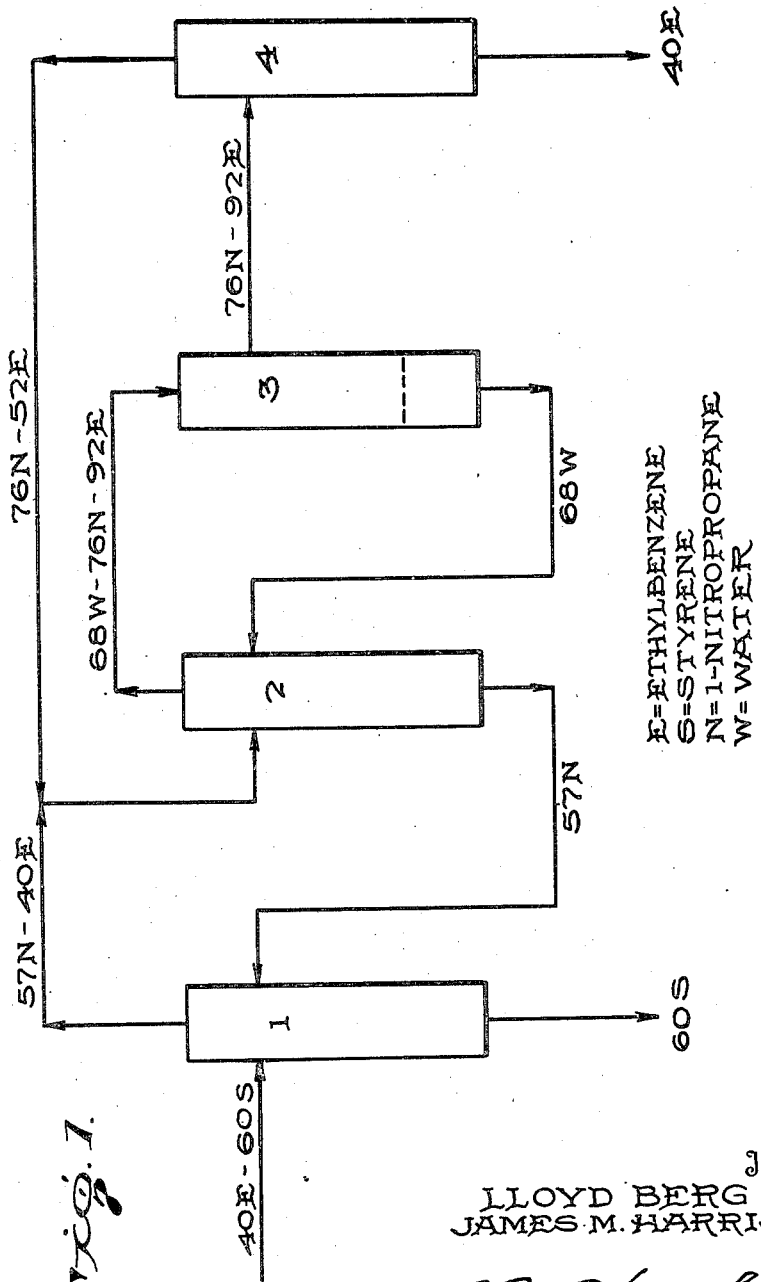

Inventors
LLOYD BERG
JAMES M. HARRISON

Patented Aug. 2, 1949

2,477,715

UNITED STATES PATENT OFFICE 2,477,715

AZEOTROPIC DISTILLATION OF STYRENE-CONTAINING HYDROCARBON FRACTIONS

Lloyd Berg, O'Hara Township, Allegheny County, and James M. Harrison, Oakmont, Pa., assignors to Gulf Research & Development Company, Pittsburgh, Pa., a corporation of Delaware Application September 17, 1945, Serial No. 616,860

10 Claims. (Cl. 202—42)

This invention relates to azeotropic separation and, more particularly, to a process for separating styrene from other hydrocarbons boiling in the range of styrene by the use of an azeotrope.

One important method for the manufacture of styrene is by the dehydrogenation of ethylbenzene. The yields of styrene are usually within the range of from 30 to 70 per cent per pass. The fact that during dehydrogenation only a portion of the ethylbenzene under treatment is transformed does not represent a serious loss, provided the styrene can be readily and completely separated from the ethylbenzene and the latter recycled for further dehydrogenation to styrene. It is also important that the styrene be separated in a relatively pure state, because this is essential in many of its uses.

In practice, however, difficulties are met in the separation of ethylbenzene from styrene by distillation, since the boiling points of the two components are close (136° C. and 146° C. at 760 mm., respectively) and because of the ease with which styrene polymerizes. These difficulties are also met in separating styrene from a mixture of it and other hydrocarbons boiling in the range 120° to 150° C.

Thus, one of the objects of this invention is to provide a process whereby styrene may be separated from a mixture of it and other hydrocarbons boiling in the range 120° to 150° C.

Another object of this invention is to provide a process whereby styrene and ethylbenzene may be efficiently and economically separated.

It is a further object of this invention to provide a process for separating styrene and ethylbenzene by the addition of a third component capable of forming an azeotropic mixture with ethylbenzene but not with styrene from which styrene can easily be separated.

These objects are attained by separating styrene from other hydrocarbons boiling in the range 120° to 150° C. by the use of 1-nitropropane. The 1-nitropropane forms a constant boiling mixture (azeotrope) with the hydrocarbon, which azeotrope boils much lower than styrene. For example, the ethylbenzene-1-nitropropane azeotrope boils at 127.5° C. The mixture contains about 41 per cent by weight of ethylbenzene. The 1-nitropropane forms no azeotrope with styrene.

As applied to ethylbenzene, the invention is carried out by adding to the ethylbenzene-styrene mixture an amount of 1-nitropropane preferably in excess of 57 parts for each 40 parts of ethylbenzene present, and distilling off the azeotropic mixture of ethylbenzene-1-nitropropane thus formed and leaving styrene. The ethylbenzene may be separated from the 1-nitropropane by the use of steam or a selective solvent.

Figure 2:
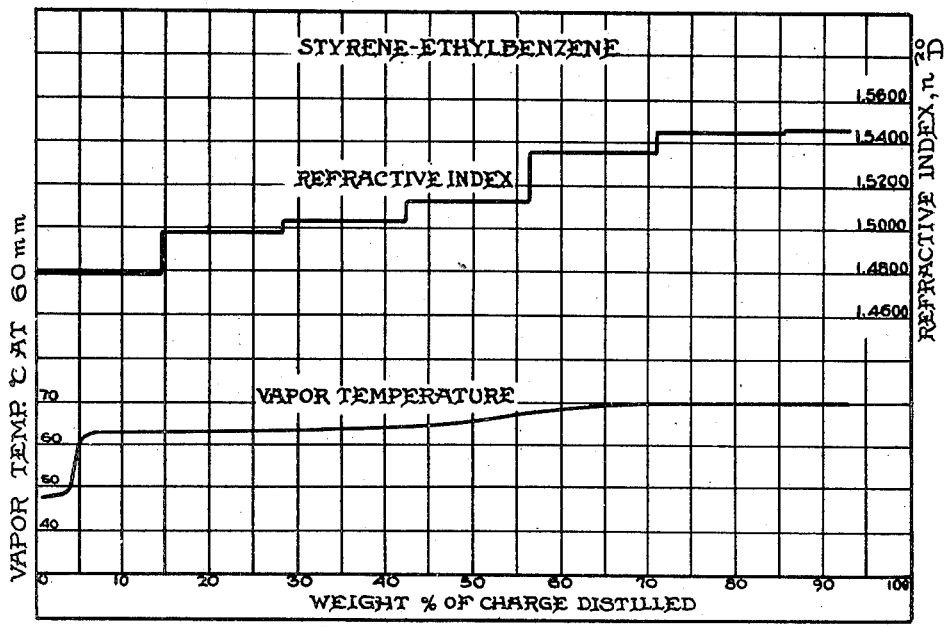
Figure 3:
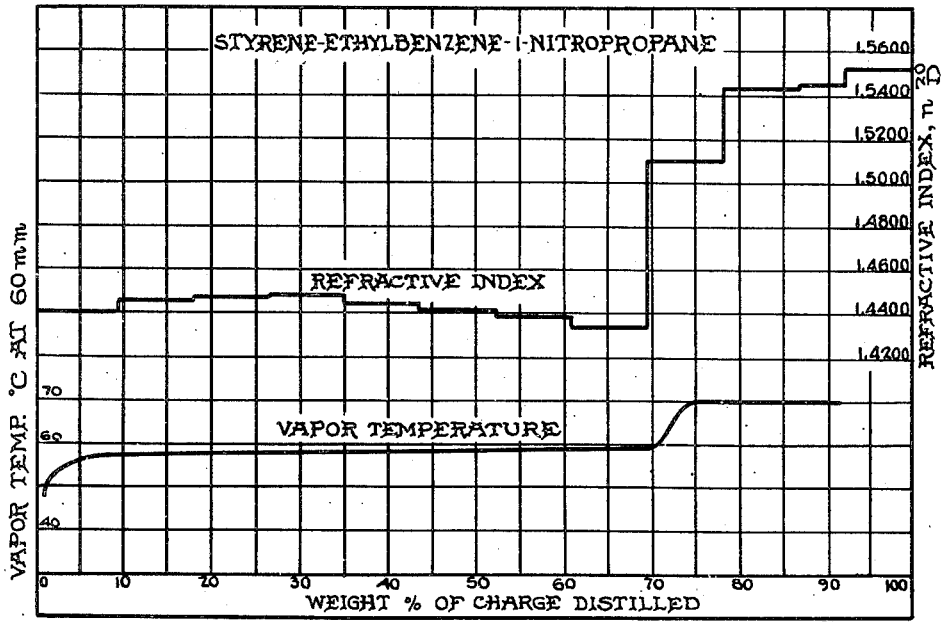

Referring to the drawings:

Fig. 1 is a diagrammatic flow sheet illustrating one embodiment of the invention; and Figs. 2 and 3 are graphs for comparison of a styrene-ethylbenzene distillation with and without 1-nitropropane.

In the process shown in Fig. 1, the ethylbenzene-styrene mixture in a parts-by-weight ratio of 40 parts ethylbenzene to 60 parts styrene enters a fractionating column 1, together with 57 parts by weight of 1-nitropropane. Heat is applied and in the distillation which results, the azeotrope, consisting of 57 parts 1-nitropropane and 40 parts ethylbenzene, is distilled off, leaving 60 parts of substantially pure styrene which is withdrawn from the bottom of the column 1. The azeotrope is mixed with another azeotrope of a 76 parts 1-nitropropane and 52 parts ethylbenzene ratio and these together enter fractionating column 2, to which is also added 68 parts of water in the form of steam. The ethylbenzene and nitropropane form a ternary azeotrope with water, wherein the ethylbenzene-to-nitropropane ratio in the ternary azeotrope is greater than in the ethylbenzene-1-nitropropane binary azeotrope. Thus, when the distillation takes place in column 2, the ternary azeotrope distills off leaving some nitropropane (57 parts) which is withdrawn from the bottom of the column and returned to column 1. The ternary azeotrope, containing water, 1-nitropropane and ethylbenzene in the parts-by-weight ratio of 68–76–92, respectively, is distilled over to decanter 3. In decanter 3, the water is separated and returned to column 2. The organic layer from decanter 3, now richer in ethylbenzene than a binary ethylbenzene-1-nitropropane azeotrope, is passed to a rectifying column 4, where the removal of the ethylbenzene-1-nitropropane azeotrope (in the ratio 76 parts 1-nitropropane to 52 parts ethylbenzene) leaves some pure ethylbenzene as bottoms (40 parts by weight).

It will be seen that Fig. 1 illustrates the process in an exemplary manner, since with continuous operation, the various ingredients may be extracted from or added to the columns in amounts different from the exact parts-by-weight indicated.

In the chart shown in Fig. 2, there is illustrated both the vapor temperature and refractive index of a 50-50 (on a weight basis) mixture of styrene and ethylbenzene. These figures are based on a batch rectification in a 30-plate column at a reflux ratio of 8 to 1. The lower curve gives the vapor temperature vs. the weight per cent of the charge distilled. The upper curve gives the refractive index of the distillate vs. the weight per cent of the charge distilled. It will be noted that after some of the low boiling impurities are taken off the mixture boils at a fairly constant temperature, until about 47 per cent has been distilled. The temperature rises gradually until about 72 per cent has been distilled, at which point the temperature reaches the boiling point for styrene. The refractive index curve gives a measure of the purity of the product being distilled. The refractive index at 20° C. for the pure compounds used are: ethylbenzene=1.4959, styrene=1.5464. From the upper curve it will be seen that the purity of the product is low throughout most of the distillation. The refractive index lying between that of the two pure components throughout most of the distillation indicates a mixture of the two.

The graph shown at Fig. 3 is similar to that shown at Fig. 2, except that 1-nitropropane has been added to the mixture. The starting charge has the following composition:

Styrene _____per cent by weight__ 27.9
Ethylbenzene _____per cent__ 27.9
1-nitropropane _____ do____ 44.2
                                       _____
                                       100.0

The same column and reflux ratio was employed as in Fig. 2. After initial removal of the lower boiling impurities, the azeotrope ethylbenzene-1-nitropropane came off steadily, as indicated by both the refractive index and the vapor temperature, until the azeotrope was exhausted, at which point both the vapor temperature and the refractive index indicate that substantially pure styrene came off.

In order that the process be carried out in the most economical manner, it is necessary to separate the 1-nitropropane from the ethylbenzene. The preferred manner of doing this has been illustrated in Fig. 1, where a ternary azeotrope of 1-nitropropane, ethylbenzene and water was formed. This illustrates a system whereby styrene and ethylbenzene may be separated and obtained in substantially pure form. The system is one in which 1-nitropropane is circulated by alternately being formed into an azeotrope and separated, and in which water is circulated by being alternately formed into a ternary azeotrope and separated.

Another method of separating the 1-nitropropane from ethylbenzene is by selective solution of 1-nitropropane with nitric acid, formic acid or the glycols, such as ethylene glycol and propylene glycol. Selective solvent extraction is followed by rectification steps to separate the individual ingredients.

It will be seen from the above description of the invention that the preferable amount of 1-nitropropane to be used is an amount sufficient to form a mixture containing a 2 to 3 ratio of ethylbenzene to 1-nitropropane, or, more precisely, 40 parts by weight ethylbenzene to 57 parts 1-nitropropane. Lesser amounts of 1-nitropropane can be used but the full effect of its presence is found by using the above specified amount. It is preferable, if amounts corresponding to the exact 57-40 proportion are not to be used, that the amount of 1-nitropropane be in excess, since it is not difficult to separate the 1-nitropropane from the styrene by distillation. For this purpose, the use of 80 parts of 1-nitropropane per 40 parts ethylbenzene does not deviate from the invention.

The present invention applies as well to the separation of styrene from certain hydrocarbons other than ethylbenzene. Hydrocarbons boiling below 120° C. can be separated from styrene by regular straight rectification and hence azeotropic methods are unnecessary. Any 1-nitropropane azetrope of a hydrocarbon boiling above 150° C. would contain so little hydrocarbon that it would not be economical to use that means of separation and straight rectification will accomplish the same result. Thus, we are concerned with the separation of styrene from other hydrocarbons boiling in the range 120° to 150° C.

The following separations have been carried out and the data on the azeotrope found as shown. In each case 1-nitropropane is the other ingredient in the azeotrope and in each case separation of the azeotrope from styrene was effected:

| Hydrocarbon | B. P., °C. 760 mm. | Azeotrope | |
|---|---|---|---|
| | | B. P., °C. 760 mm. | Wt. percent H. C. |
| Ethylbenzene | 136.1 | 127.4 | 41 |
| 9-C Atom Non-Aromatic | 152.1 | 125.3 | 26 |
| 8-C Atom Non-Aromatic | 125-145 | 110-122 | 60 |
| M-Xylene | 139 | 128 | 32 |

In addition other hydrocarbons boiling in the range 120°-150° C. have been estimated to form azeotropes with 1-nitropropane as follows:

| Hydrocarbon | B. P., °C. 760 mm. | Azeotrope | |
|---|---|---|---|
| | | B. P., °C. 760 mm. | Wt. percent H. C. |
| N-Nonane | 150 | 124.5 | 27 |
| 2,6-Dimethylheptane | 135 | 124 | 45 |
| N-Octane | 125 | 121 | 60 |
| 4-Ethylheptane | 142 | 127 | 38 |
| 1,1,3-Trimethylcyclohexane | 138 | 127 | 40 |
| Ethylcyclohexane | 130 | 125 | 45 |

While the above description of the invention is concerned with atmospheric pressure, other pressures, such as 60 to 200 mm. Hg, may be used and rectification temperatures thereby lowered.

Alternatively it is possible and even preferable, since it eliminates a step, to add both water and 1-nitropropane to the hydrocarbon-styrene mixture. For example, in Fig. 1 of the drawing column 1 can be eliminated and the feed introduced into column 2, together with 76 parts 1-nitropropane, 52 parts ethylbenzene and 68 parts water. 60 parts of styrene come off column 2 as bottoms and the overhead is in the proportion shown in the drawing.

The process described may be either a batch process or a continuous process, but it is particularly adapted for use in a continuous process.

One of the principal advantages of the present process is the utilization of a column of fewer theoretical plates than would be ordinarily used in the separation of these components.

Thus we have described a new and useful process for the separation of styrene from hydrocarbons boiling in the range 120° to 150° C. by the use of 1-nitropropane to form an azeotrope with the hydrocarbons.

What we claim is:

1. A method for the separation of styrene from a mixture containing it and a hydrocarbon impurity boiling in the range 120° to 150° C. which comprises adding 1-nitropropane and water to the mixture and distilling off the resultant ternary azeotrope, comprising 1-nitropropane, water and the hydrocarbon impurity boiling in the range 120° to 150° and leaving styrene undistilled, stratifying the ternary azeotrope to form an aqueous layer and a layer containing the 1-nitropropane and the hydrocarbon impurity, separating at least part of the hydrocarbon impurity from the layer containing it and the 1-nitropropane and reusing the 1-nitropropane in the above-mentioned distillation.

2. A method for the separation of ethylbenzene and styrene from a mixture of the two which comprises adding 1-nitropropane and water to the mixture and distilling off the resultant ethylbenzene-water-1-nitropropane azeotrope, leaving styrene undistilled, stratifying the azeotropic distillate into a water layer and an ethylbenzene-1-nitropropane layer, separating at least part of the ethylbenzene contained in the ethylbenzene-1-nitropropane layer and reusing the nitropropane in the above-mentioned distillation.

3. In a process for the manufacture of styrene by the dehydrogenation of ethylbenzene until it contains a substantial amount of styrene in admixture, the steps which comprise treating the mixture with 1-nitropropane to form a binary ethylbenzene-1-nitropropane azeotrope, distilling off the binary azeotrope from the styrene, adding water to said azeotrope, distilling off the ternary azeotrope, water-ethylbenzene-1-nitropropane, thus formed, leaving behind some 1-nitropropane, condensing and decanting the water from said ternary azeotrope, fractionating the organic product thus formed to separate some ethylbenzene and said binary azeotrope.

4. A process for the treatment of an oil fraction containing styrene and at least one aromatic hydrocarbon having the empirical formula $C_8H_{10}$ which comprises distilling said oil fraction and rectifying the vapors in the presence of 1-nitropropane and thereby taking off a distillate comprising an azeotrope of said aromatic hydrocarbon and said 1-nitropropane and leaving a residue enriched in styrene, rectifying vapors of said azeotrope in the presence of water and thereby taking off a distillate comprising water and said aromatic hydrocarbons and leaving 1-nitropropane separated from said aromatic hydrocarbons.

5. In a method for increasing the styrene content of an oil containing styrene and like-boiling non-styrene hydrocarbons, the steps which comprise adding 1-nitropropane to the oil, subjecting this mixture to fractional distillation in the presence of water to take off as distillate an azeotropic mixture comprising water and non-styrene hydrocarbons, stratifying the distillate into water and hydrocarbon layers and returning the water to the upper part of the fractionating column, continuing fractional distillation, stratification of distillate, and return of water to the upper part of the column until the greater part of the non-styrene hydrocarbons has been separated from the styrene oil, and thereafter withdrawing as product a styrene oil richer in styrene than the original oil.

6. A process for the separation of styrene from a mixture containing styrene and a like-boiling non-styrene hydrocarbon which comprises distilling said mixture and rectifying the vapors in the presence of 1-nitropropane and thereby taking off a distillate comprising an azeotrope of said 1-nitropropane and said like-boiling non-styrene hydrocarbon and leaving a residue enriched in styrene, rectifying vapors of said azeotrope in the presence of water and thereby taking off a distillate comprising water and said like-boiling non-styrene hydrocarbon and leaving 1-nitropropane separated from said like-boiling non-styrene hydrocarbon.

7. A continuous process for the separation of styrene from a mixture containing it and ethylbenzene which process comprises adding 1-nitropropane to the mixture, subjecting the mixture thus formed to a first distillation to separate an azeotrope-containing ethylbenzene and 1-nitropropane and to leave styrene as an undistilled residue, separating the undistilled styrene, adding water to the ethylbenzene, 1-nitropropane azeotrope, subjecting this mixture of ethylbenzene, 1-nitropropane and water to a second distillation to separate an azeotrope comprising water, ethylbenzene and 1-nitropropane and to leave 1-nitropropane as an undistilled residue, withdrawing the undistilled 1-nitropropane and re-using it in the first distillation, separating the water from the ethylbenzene-1-nitropropane-water azeotrope and re-using it in the second distillation, distilling the remaining 1-nitropropane-ethylbenzene mixture to form an ethylbenzene-1-nitropropane azeotrope and to separate ethylbenzene as an undistilled residue and returning the azeotropic mixture of ethylbenzene and 1-nitropropane to the second distillation step.

8. A continuous process for the separation of styrene from a mixture containing it and ethylbenzene which process comprises adding 1-nitropropane and water to the mixture, subjecting the mixture thus formed to a first distillation to separate therefrom an azeotrope containing water, ethylbenzene and 1-nitropropane and to leave styrene as an undistilled residue, separating the undistilled styrene, separating the water from the ethylbenzene-1-nitropropane-water azeotrope, and re-using it in the first distillation, distilling the remaining 1-nitropropane-ethylbenzene mixture to form an ethylbenzene-1-nitropropane azeotrope and to separate ethylbenzene as an undistilled residue and returning the azeotropic mixture of ethylbenzene and 1-nitropropane to the first distillation step.

9. A method for the separation of styrene from a mixture of the same with at least one like boiling non-styrene hydrocarbon which comprises adding 1-nitropropane to the mixture and distilling off an azeotrope comprising 1-nitropropane and said like boiling hydrocarbon, subjecting a mixture comprising said azeotrope and water to distillation, taking off a distillate comprising water and said like boiling hydrocarbon and leaving 1-nitropropane separated from said hydrocarbon.

10. In a method for increasing the styrene content of an oil containing styrene and at least one like-boiling non-styrene hydrocarbon, the steps which comprise adding 1-nitropropane to the oil, subjecting this mixture to fractional distillation in the presence of water to take off as distillate an azeotropic mixture comprising water and non-styrene hydrocarbons, stratifying the distillate into layers comprising a water layer and comprising a hydrocarbon layer, returning the water layer to the upper part of the fractionating column, and continuing fractional distillation, stratification of distillate and return of water to the upper part of the column until the greater part of the non-styrene hydrocarbon has been separated from the styrene oil.

LLOYD BERG.
JAMES M. HARRISON.

REFERENCES CITED

The following references are of record in the file of this patent:

UNITED STATES PATENTS

| Number | Name | Date |
|---|---|---|
| 2,162,963 | McKittrick | June 20, 1939 |
| 2,316,126 | Geckler et al. | Apr. 6, 1943 |
| 2,381,996 | Bloomer | Aug. 14, 1945 |
| 2,385,610 | Clark | Sept. 25, 1945 |
| 2,398,689 | Bloomer | Apr. 16, 1946 |

OTHER REFERENCES

Mair et al.: "Separation of hydrocarbons by azeotropic distillation," Bureau of Standards Journal of Research, vol. 27, pages 39–63 (July 1941). Copy in Scientific Library, 202/42–H.